G. W. MATSON.
FILTERING MATERIAL.
APPLICATION FILED MAR. 9, 1920.

1,411,975.  Patented Apr. 4, 1922.

WITNESSES  INVENTOR
George W. Matson.
BY
ATTORNEYS

UNITED STATES PATENT OFFICE.

GEORGE W. MATSON, OF BROOKLYN, NEW YORK.

FILTERING MATERIAL.

1,411,975.  Specification of Letters Patent.  Patented Apr. 4, 1922.

Application filed March 9, 1920. Serial No. 364,576.

*To all whom it may concern:*

Be it known that I, GEORGE W. MATSON, a citizen of the United States, and a resident of the city of New York, borough of Brooklyn, New York, have invented a new and Improved Filtering Material, of which the following is a description.

My invention relates to a filtering material adapted to be made up in sheets to be given any desired form either flat, curved, or rolled, etc.

The general object of the invention is to provide a laminated filtering material which will be highly effective as a filtering medium and at the same time will afford a desirable passage of a fluid therethrough so that a filter equipped with said material will have a comparatively large capacity.

The nature of the invention and its advantages will more clearly appear from the description and claims hereinafter given.

Reference is to be had to the accompanying drawings forming a part of this specification, it being understood that the drawings are merely illustrative of one example of the invention.

Figure 1:
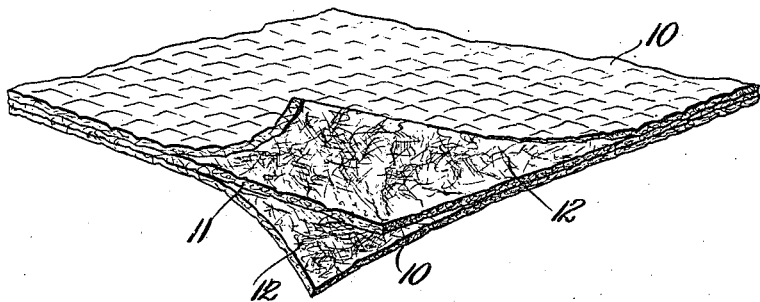
Figure 1 is a perspective view showing filtering material embodying my invention, the outer sheets being turned back to more clearly show the intermediate layers of material.
Figure 2:
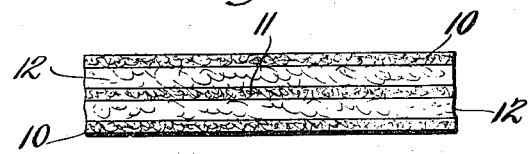
Figure 2 is a cross section of the material before being compacted into final form.
Figure 3:
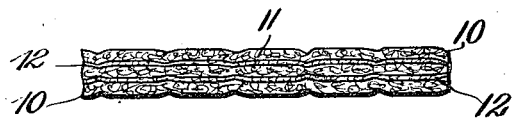
Figure 3 is a cross section of the finished material.

In carrying out my invention in practice two outer filtering sheets 10 are provided which may consist of any approved sheet filtering material but preferably said outer layers 10 are composed of a sheet material made from cotton lint.

Associated with said outer sheets 10 I provide an intermediate sheet 11 comparatively stiff composed of an intermixture of lint, asbestos and pulp, which in practice, may be made by the usual methods by which paper is produced, that is to say, by floating the mixture of materials onto a screen.

Between the intermediate sheet 11 and each outer sheet 10 I arrange a layer of lint 12 laid in loose form which when the several laminæ are compacted into a unitary sheet felts onto the opposed surfaces of the sheets 10, 11.

With a filtering material made as described, the effective filtering of fluid may be obtained and at the same time the material is porous to a degree to permit a comparatively free passage of the fluid therethrough.

The material may be shaped as desired according to the purpose for which it is to be used or the nature of the apparatus with which it is to be associated.

I would state in conclusion that while the illustrated example constitutes a practical embodiment of my invention, I do not limit myself strictly to the mechanical details herein illustrated, since manifestly the same can be considerably varied without departure from the spirit of the invention as defined in the appended claims.

Having thus described my invention, I claim:

1. As a new article of manufacture, a laminated filtering material including outer sheets and an intermediate sheet, and layers of lint between said sheets at opposite sides of the intermediate sheet, the whole being compacted in the form of an integral sheet material.

2. As a new article of manufacture, a filtering material comprising a layer of loose lint and sheets of filtering material at opposite sides of said layer, the whole being compacted.

3. As a new article of manufacture, a laminated filtering material including a sheet of filtering material in which asbestos and lint are incorporated.

4. As a new article of manufacture, a laminated filtering material including a sheet of filtering material in which lint and pulp are incorporated.

5. As a new article of manufacture, a laminated filtering material including a sheet of filtering material in which asbestos and pulp are incorporated.

6. As a new article of manufacture, a laminated filtering material including a sheet of filtering material in which asbestos, lint and pulp are incorporated.

7. As a new article of manufacture, a filtering medium in the form of sheet material in which asbestos and loose lint are incorporated and compacted.

8. As a new article of manufacture, a filtering medium in the form of sheet material in which pulp and loose lint are incorporated and compacted.

9. As a new article of manufacture, a filtering medium in the form of sheet material in which asbestos, loose lint and pulp are incorporated and compacted.

10. As a new article of manufacture, a filtering medium in the form of sheet material in which pulp and asbestos are incorporated and compacted.

GEORGE W. MATSON.